United States Patent Office 3,446,581
Patented May 27, 1969

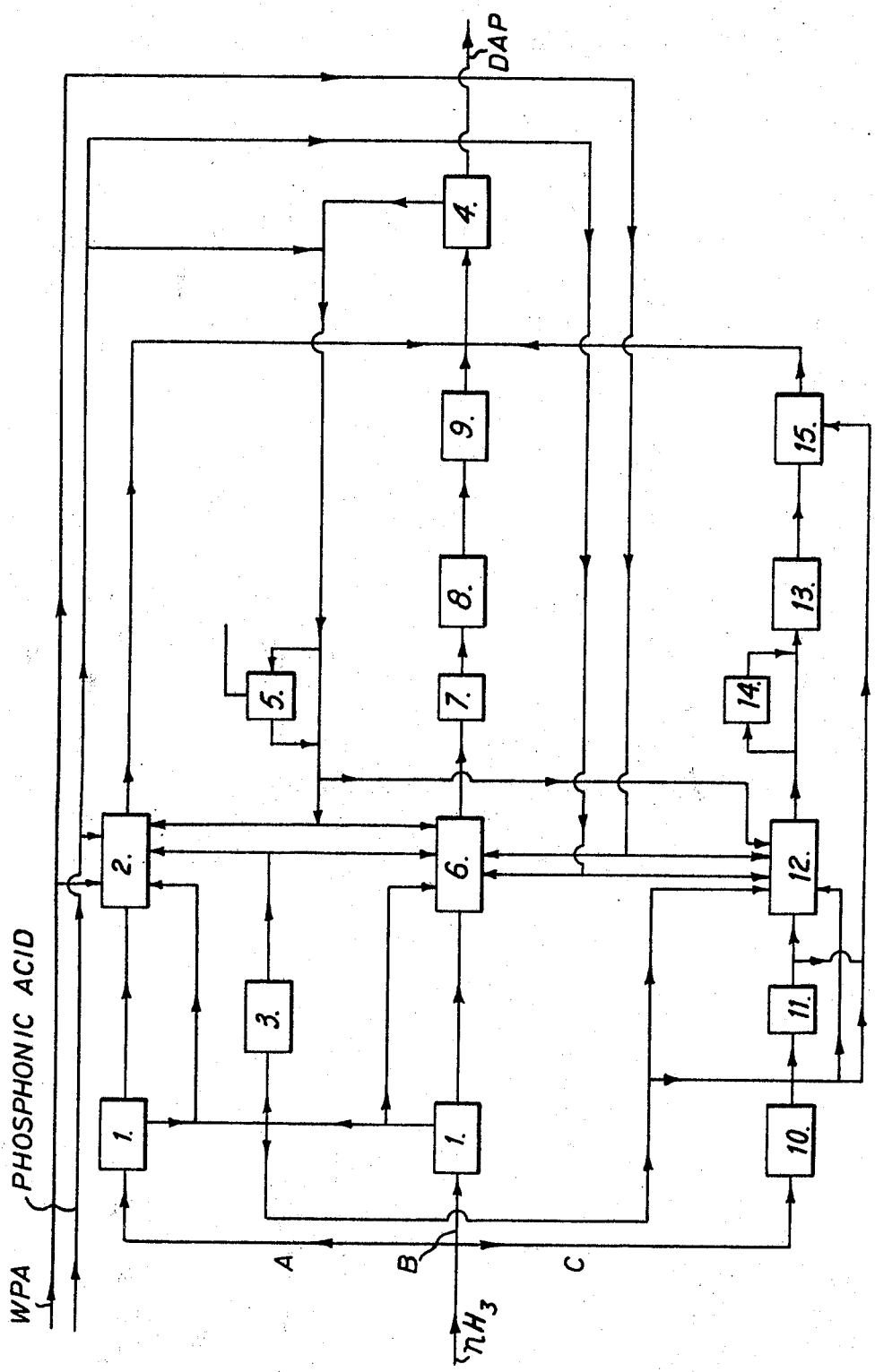

3,446,581
PREPARATION OF AMMONIUM PHOSPHATES WITHOUT UNDESIRABLE NON-SULPHIDE PRECIPITATES
Raymond Anthony Smith, Burton upon Trent, and John Thomas Dixon, Smethwick, England, assignors to Albright & Wilson (Mfg.) Limited, Birmingham, England, a British company
Filed Feb. 20, 1967, Ser. No. 617,383
Claims priority, application Great Britain, Feb. 22, 1966, 7,809/66; Oct. 13, 1966, 45,892/66
Int. Cl. C01b 25/28
U.S. Cl. 23—107    14 Claims

ABSTRACT OF THE DISCLOSURE

Storage stable precipitate free solutions of ammonium phosphates to be prepared from wet process acid and ammonia, if the reaction is carried out in the presence of at least sufficient of a sequestering agent comprising a phosphonic acid of the general formula

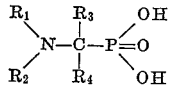

wherein $R_1$, $R_2$, $R_3$ and $R_4$ are each hydrogen or alkyl groups and may be the same or different, or $R_1$ and/or $R_2$ may be

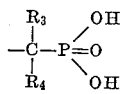

or alkyl ether groups, or a water soluble salt or acid ester thereof, to prevent the formation of precipitates other than sulphides during the reaction. Crystalline diammonium phosphates may be recovered from these solutions and aqueous solutions subsequently prepared from the crystalline material, which solutions remain stable over prolonged periods and upon the addition of potassium thereto.

---

The present invention relates to a process for the preparation of ammonium phosphates, for example diammonium phosphate, from wet process phosphoric acid.

The ammonia contained in the gas stream evolved during the destructive distillation of coal, as for example in a coke oven or a gas works, has long been known to be a source of low cost ammonia. However, there are many uses for which it has not hitherto been considered possible to employ such ammonia, firstly because of the extra impurities (mainly $H_2S$) contained in such gas, and secondly because of the large quantity of extra water present in the aqueous solution known as ammoniacal liquor, obtained by the water scrubbing of the gas stream.

It is known to make ammonium phosphates by the reaction of thermal phosphoric acid with either synthetic or gas works ammonia but, due to the high cost of the acid this has proved an expensive process for fertiliser production. It has therefore been suggested to use wet process phosphoric acid (hereinafter called WPA). However, with this acid it has not hitherto been possible to obtain a useable product on neutralisation with ammonia, even when this is pure synthetic ammonia, since the impurities present in WPA give rise to a gelatinous precipitate upon reaction with ammonia. It has been proposed to carry out the reaction in the presence of a polyphosphate sequestering agent to reduce the precipitate formation. However, whilst the precipitation was reduced, the solutions obtained progressively formed a precipitate upon storage and this rendered them unsuitable for liquid fertilisers unless they were used soon after manufacture. This was clearly a disadvantage. In British patent specification No. 1,020,-182 there are described processes whereby a crystalline diammonium phosphate product could surprisingly be obtained by the reaction of WPA and gas works ammonia in the presence of a polyphosphate heel.

Whilst the crystalline product would be stable and could be stored for long periods, the impurities present therein restricted its utility. Thus, the base metal polyphosphate complexes therein progressively precipitated out when the product was redissolved in water and immediate precipitation occurred when potassium was added to aqueous solutions of the product.

Surprisingly, we have now found that storage-stable, precipitate free ammonium phosphate solutions may be prepared from WPA and ammonia, if the reaction is carried out in the presence of a sequestering agent comprising certain phosphonic acids. Furthermore, we have also found that crystalline diammonium phosphate may be recovered from the ammonium phosphate solutions of the invention, which crystalline materials may be redissolved to yield storage-stable clear solutions which remain clear even after potassium is added thereto. This property is most surprising in view of the inability of polyphosphates to achieve a similar result.

Accordingly, the present invention provides a process for the production of storage-stable ammonium phosphate solutions, which process comprises reacting wet process phosphoric acid with ammonia the reaction being carried out in the presence of at least sufficient of a sequestering agent comprising a phosphonic acid of the general formula:

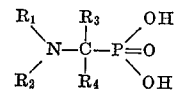

wherein $R_1$, $R_2$, $R_3$ and $R_4$ are each hydrogen or alkyl groups and may be the same or different, or $R_1$ and/or $R_2$ may be

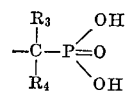

or alkyl ether groups; or water soluble salts or acid esters thereof, to prevent the formation of precipitates, other than sulphides, during the reaction. From another aspect, the invention provides a process for producing crystalline diammonium phosphates wherein the diammonium phosphate contained in the ammonium phosphate solutions of the invention is recovered by a crystallization technique, the atomic ratio of nitrogen to phosphorus in the liquor from which crystallization takes place having a value of from 1.5:1 to 2.0:1.

Although the invention in its broadest scope relates to the production of storage-stable solutions of ammonium phosphates, the particular embodiment of the invention relating to the production of a crystalline product will for convenience be described first.

The phosphonic acids for present use have the general formula set out above. Suitable acids include those wherein the R groups are lower alkyl groups such as methyl, ethyl, propyl or butyl groups, though the $R_1$ and $R_2$ groups may also be long chain alkyl groups containing ether linkages. However, it is preferred that the $R_3$ and $R_4$ groups be hydrogen and that the $R_1$ and $R_2$ groups are each

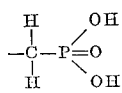

groups.

The phosphonic acids of the preferred structure may be readily prepared by reacting ammonium, or a primary or secondary amine, with phosphorous acid and an alkehyde or ketone. An especially preferred method for preparing the phosphonic acids for present use is that described and claimed in U.K. specification No. 1,023,785.

In place of the phosphonic acid for present use, there may be employed the water soluble salts or acid esters thereof. Preferred salts are the alkali metal, especially the potassium, or ammonium salts, though mixed salts of two or more cations or mixtures of salts may also be employed. Where esters are employed, it is necessary to use those having at least one free P—OH group and it is preferred to use those esters derived from short chain alcohols such as methyl, ethyl or propyl alcohols, in order to provide the desired degree of water solubility. However, since the phosphonic acids, or their salts or esters, may be used in conjunction with polyphosphoric acids, as indicated below, or be added to the wet process phosphoric acid prior to its reaction with ammonia, in which cases they undergo ionisation or hydrolysis and are converted to the phosphonic acid or its anion, there is usually no advantage in using the salts or esters rather than the free acid.

The amount of phosphonic acid used in the present invention is at least that amount required to prevent precipitation of the impurities in the wet process acid and the ammonia (other than sulphides). This amount will vary with the phosphoric acid and ammonia employed and may be readily ascertained by simple trial and error. Generally the amount required will not exceed 30% by weight, calculated as the free phosphoric acid, based on the $P_2O_5$ content of the phosphoric acid, though we have found that amounts of from 4 to 10% are usually sufficient.

During the production of crystalline diammonium phosphate (hereinafter called DAP) according to the process of the invention the amount of phosphonic acid present in the reaction mixture will decrease due to the formation of phosphonic acid base metal complexes and their co-crystallisation with the DAP, and the occlusion and drag out of phosphonic with the crystals of DAP. These losses may be conveniently made up by adding the appropriate amount of the phosphonic acid to the mother liquors upon recycling or to the reaction mixture.

The ammonia for use in the present invention may either be pure ammonia (that is synthetic or natural ammonia which has undergone purification) or impure ammonia, such as gas-works ammonia. For economic reasons it is preferred to use impure ammonia, though the process using pure ammonia is substantially identical to that described herein, which for convenience is described solely in relation to gas-works ammonia. The ammonia may be used in either gaseous or liquid form. When gaseous ammonia is used in the process of this invention, it is reacted with WPA, preferably at a temperature of 75° C. or less, the water content of the reaction mixture being maintained at such a level that the reaction mixture is supersaturated with respect to diammonium phosphate. When ammoniacal liquor is used, the product of the reaction of the wet process acid with the ammoniacal liquor is evaporated to a concentration corresponding with a solution supersaturated with respect to DAP at room temperature, and the concentrated liquor is then cooled to yield a crystalline product.

The ammonia for present use may be obtained, for example, from the gas stream produced in a coke oven. This gas stream will contain a number of impurities, such as tars, $H_2S$, cyanides and phenols. The tars are preferably, but not necessarily, removed by scrubbing the gas stream with water, which incidentally also removes about 30% of the ammonia in the gas stream. The gas stream may be used in the proces of the invention as such without any further purification. The ammonia that is absorbed from the gas stream in the scrubber forms an aqueous layer above the tars and may be decanted off. This ammoniacal liquor may be added as such to the reaction vessel in a sufficient quantity to provide the required amount of water. The remainder may be distilled, usually in the presence of lime, to provide gaseous ammonia which may be fed back into the gas stream. Alternatively the whole of the ammoniacal liquor may be treated in this latter way. A third possibility is to use the ammoniacal liquor without gaseous ammonia. However, when this is done, it is preferred to employ ammoniacal liquor containing at least 10% by weight $NH_3$ and the weak solution obtained as above would require concentration by the process known as dephlegmation in order to attain such concentrations. It is, however, preferred to use conventional coke oven techniques for scrubbing a much greater proportion of the ammonia from the gas stream. The resulting ammoniacal liquor is again preferably concentrated to at least 10% before use.

The phosphoric acid for present use may be any of the commercially available wet process acids, which usually contain at least 25% $P_2O_5$. However, as indicated below it may be desirable to employ more concentrated acids, e.g. those of from 50 to 60% $P_2O_5$, in order to reduce the amount of water fed to the system.

The object of the invention is to utilize as much ammonia as possible from the coal gas stream or ammoniacal liquor while producing a fertiliser in which the maximum amount of ammonia is combined per molecule of phosphoric acid. These two requirements tend to be contradictory, since the vapour pressure of ammonia not only increases, but increases very rapidly, as the $N:P$ ratio increases from a value of about 1.3:1. If the conditions are such that mono-ammonium phosphate is formed, there will be a high recovery of ammonia but the $N:P$ value of the product will be rather low. If, on the other hand, tri-ammonium phosphate is formed, there will be a low recovery of ammonia. Moreover, such a product loses ammonia on storage. The best compromise is a product consisting wholly or mainly of di-ammonium phosphate.

DAP is formed by the reaction of phosphoric acid and ammonia when the $N:P$ ratio has a value of above 1.0 and predominates when the value is between 1.5 and 2.5. Beyond these limits mono- or tri-ammonium phosphates are produced in predominance. This sets the lower limit of 1.5:1 for the $N:P$ ratio, but the upper limits should not be high enough for any significant amount of tri-ammonium phosphate to be formed. The upper limit of the $N:P$ ratio consistent with this requirement is 2.0:1. As just mentioned, the lower limit of 1.5:1 for the $N:P$ ratio in the process of the invention represents a compromise between the two requirements of maximum stripping of ammonia and production of a fertiliser with a maximum $N:P$ ratio. Other considerations arise from the chemical engineering aspects of the process. The solubility of ammonium phosphates varies with the ratio of $N:P$ present in the system. The maximum occurs at an $N:P$ ratio of about 1.4:1 at 50° C. and the position of this maximum does not vary much at higher temperatures. However, saturated solutions at this maximum solubility may have too high a viscosity for convenient handling in the apparatus used when gaseous ammonia is employed in the process of the invention. A suitable compromise between the solubility and viscosity considerations is obtained at an $N:P$ ratio of 1.5:1, which is the same as the lower limit for the production of a commercially acceptable product.

In the process of the invention where gaseous ammonia, in the form of the ammonia-containing gas stream, is used, the neutralisation of the WPA is conveniently carried out in a single reaction vessel from which the crystalline products are removed as they are formed and the mother liquor of the reaction mixture recycled. While an acceptable product and workable operating conditions are obtainable with an $N:P$ ratio from 1.5:1 to 2.0:1 in the reaction mixture, we have found that the optimum ratio is towards the upper end of this range, and we prefer to operate at a ratio of 1.7:1 to 1.9:1. The $N:P$ ratio may be conveniently controlled by the amount of acid introduced into the reaction mixture. The ammonia content of the gas stream is almost constant in the region of 1% and the composition of the recycled mother liquor is substantially that of a saturated solution of DAP with minor amounts of mono-ammonium phosphate, phosphonic acid base metal complexes and the residue of the sequestrant heel, and also remains substantially constant. Ideally the amounts of ammonia and acid added are in the molar ratios of 2:1 to form DAP. However, due to minor fluctuations in the composition of the recycled mother liquor and the ammonia content of the gas stream it is necessary to vary the amount of acid so as to maintain the desired $N:P$ ratio in the reaction mixture. Similarly the amount of water present in the system may be controlled by the concentration of the acid, water being added to maintain a sufficient quantity of saturated DAP solution, there being water losses due to evaporation caused by the heat of reaction and the evaporative effect of the flow of the gas stream through the reaction mixture. The choice of the temperature of the reaction mixture is also affected by the compromise between the various reaction conditions to enable the desired range of $N:P$ ratios to be obtained since temperature affects the vapour pressure of ammonia over the reaction mixture. In order to obtain a sufficiently low ammonia slip at an $N:P$ ratio of from 1:5 to 2.0:1 it has been found necessary to operate at a temperature of from 30° C. to 75° C. Within the preferable temperature range of 55 to 65° C. it is possible to operate at an $N:P$ ratio of from 1.8 to 1.9:1 with an ammonia loss of only about 5%.

The reaction of the WPA and gaseous ammonia may take place in two main types of reactor: an absorber where the mixture of acid and recycled mother liquor is sprayed into the gas stream, the ammonia being absorbed therefrom, or in a saturator wherein the gas stream is passed through the said mother liquor and acid. Of the two types we prefer to employ the absorber type of vessel.

In view of the fact that the process is a compromise between various factors, ammonia is still present in the effluent gas stream in amounts of about 3 to 10% of that initially present and such amounts are too large to be tolerated in industrial or domestic gas supplies. It is therefore necessary to pass the gas stream through a second reactor, or scrubber, which removes the final amounts of ammonia. This second vessel may be another WPA reactor which is now operated at a very much lower $N:P$ ratio in order to remove substantially all the ammonia, or may be a sulphuric acid scrubber of known type. It is preferred to employ a sulphuric acid scrubber since this produces ammonium sulphate which may be blended with the DAP, produced in accordance with this aspect of our invention to provide fertilizers having a range of nitrogen and phosphorus values. Alternatively, the use of a second scrubber, using, for example, sulphuric acid, may be dispensed with and the other acid may be admixed with the phosphoric acid used in the first reactor. The mixture of acids may be used to produce the desired mixture of ammonium salts directly. When using such a mixture of acids, allowance must be made for the extra ammonia required to react with the added acid when computing the relative proportions of acid to ammonia required. The added acid may be present in a weight ratio of from 0.5:1 to 20:1, preferably 0.5:1 to 5.0:1, calculated on an acid anion to $P_2O_5$ basis.

In the process of the invention where ammoniacal liquor is employed as the ammonia reactant, a two stage neutralisation of the WPA is preferably used. In the first stage the neutralisation is carried out under very dilute conditions and at low $N:P$ ratios; the resulting liquor is then concentrated by evaporation, and the crystalline DAP obtained from this solution, after adjustment of $N:P$ ratio and cooling in a chiller have been affected in the second stage. This two stage process minimises the ammonia loss on concentration of the ammonium phosphate solution to obtain crystals therefrom.

The value of the nitrogen to phosphorus atomic ratio for the first stage of neutralisation represents a compromise between the requirmeent of minimum loss of ammonia, which necessitates a low ratio, and the requirement of removing as much ammonia from the gas stream as possible in one stage, which necessitates a high ratio. We find that the best compromise is to employ $N:P$ values of between 1.4:1 and 1.5:1, preferably 1.45:1, which is near the point of maximum solubility of the ammonium phosphate system. The solution, after this first-stage neutralisation, is evaporated, preferably until it has a concentration corresponding with saturation at 110–120° C. After evaporation further ammoniacal liquor is added to increase the nitrogen:phosphorus atomic ratio to a value between 1.5 and 2.0:1. Convenient values lie within the range 1.8:1 to 1.9:1. Although this addition of ammoniacal liquor increases the water content of the solution, it is possible to concentrate the liquor obtained in the first stage of neutralisation to a sufficient extent that the further addition of ammoniacal liquor can be made without reducing the concentration of the resulting liquor to a value below that corresponding to saturation with DAP at room temperature. The further addition of ammoniacal liquor may take place before, during or after cooling of the partially neutralised concentrated liquor, but addition after cooling is much to be preferred in order to prevent further loss of ammonia.

Some preconcentration of the WPA and the ammoniacal liquor respectively may be desirable, since if too much water is present it may be difficult to produce the required super-saturated solution of DAP. As indicated above the initial concentration of WPA as normally produced is about 30% $P_2O_5$ and it may be advantageous to concentrate it by normal commercial methods to 50% $P_2O_5$ or even higher for use in the invention. As with the process using gaseous ammonia, it is possible to employ mixtures of acids, to obtain blended fertilizers directly.

The products obtained by the two forms of the process of the invention are in the form of a slurry of DAP crystals, together with a certain proportion of phosphonic acid base metal complexes in a mother liquor saturated with respect to DAP. This slurry may be obtained continuously from the reaction vessel in the process wherein gaseous ammonia is employed, or the chiller in the process wherein ammoniacal liquor is employed, and the crystals then removed from the slurry, the mother liquor being recycled to the reaction vessel in which neutralisation of the WPA with ammonia takes place.

The separation of the crystalline product from the mother liquor may be achieved by conventional methods such as filtration or centrifuging.

The mother liquor comprises a solution saturated with respect to DAP and contains other materials such as a proportion of the phosphonic acid base metal complexes, a certain amount of mono-ammonium phosphate and the residue of the sequestering agent. The composition of this recycled mother liquor remains substantially constant once equilibrium in the reaction cycle has been achieved. It has been established that the impurities present in the WPA, for example the iron, aluminium and calcium, form complexes with the phosphonic acid present to provide water soluble materials and the amounts of these materials built up during the first few recycles of the mother liquor but then appear to reach a steady level, since amounts extracted by co-crystallisation of the complexes with the DAP equal the amounts of the various bases put into the reaction cycle.

During the reaction of the WPA with impure ammonia a fine black precipitate of sulphides is formed due to the $H_2S$ present in the original gas stream and some, but not all, of this is occluded within the DAP crystals. However, the residue of this fine precipitate is not necessarily separated from the mother liquor during the recovery of the DAP crystals, since the efficiency of the separation of the fine precipitate from the mother liquor depends on the equipment used to recover the crystalline product. Therefore, on prolonged operation of the process, a sludge of sulphides may accumulate which it is desired to remove. This may be effected by removing the sulphides either from the liquors from which crystallisation will later take place, for example by filtering the liquors issuing from the WPA reaction vessels, or from the recycling mother liquors by allowing the mother liquor to stand, when the sludge settles out an the mother liquor may be decanted therefrom, or by centrifugal or other techniques.

In the process using gaseous ammonia, the viscosity of the liquor from which crystallisation occurs and the mother liquor which is to be recycled may be sufficiently great to present problems in handling these liquors. It is therefore preferred that, when such problems occur and where the sulphide sludge is to be separated from the liquors by filtration, a modified process, which can be regarded as a combination of the absorption process using gas-stream ammonia and the evaporation process used with ammoniacal liquor, be employed. This modified process comprises neutralising the WPA with gaseous ammonia to give an aqueous solution of ammonium phosphates which is not saturated with respect to DAP, removing the sulphides produced during the reaction by filtration, subsequently concentrating the resulting mother liquor to give a solution which is supersaturated with respect to DAP and recovering the crystals of DAP therefrom. The ammonia is reacted with the WPA to give an unsaturated solution of inter alia DAP. The N:P ratio employed may be from 1.5 to 2.0:1 but in view of ammonia losses during the evaporation stage it is preferred to operate at low N:P values for example 1.5 to 1.6:1 to minimise such losses.

The evaporation may be carried out by conventional methods such as heating, for example at from 110 to 120° C. as with the process of the second aspect of the invention, or by vacuum techniques. The crystalline product is recovered and the mother liquor recycled as in the unmodified process using gas-stream ammonia.

The process of the invention has so far been described solely with respect to the production of crystalline di-ammonium phosphates. However, as indicated above, the invention also relates to the production of storage stable ammonium phosphate solutions from which crystalline products may be obtained. These solutions may be prepared by any of the conventional processes, preferably carried out in such a manner as to reduce ammonia losses and yet produce a material having a high fertilizer content. The reactants and sequestering agent are the same as those described above. The solutions may, for example, be produced as intermediates in the production of the crystalline ammonium phosphates by the processes described above. However, such intermediates usually have too low an N:P ratio to be commercially attractive. The recycling mother liquors obtained in such processes are themselves storage stable solutions of ammonium phosphates and could be sold as such and not recycled as proposed above. However, these mother liquors retain a considerable proportion of the sequestering agent used and are low in ammonia. The loss of the sequestering agent from the reaction system therefore usually renders the sale of the mother liquor commercially unattractive.

The amount of sequestering agent employed in the preparation of the solutions is usually the same as that required for production of crystalline DAP from the same reactants.

Whilst the process of the invention may be carried out utilising the phosphonic acids as the sole sequestering agent, the acids may be used in admixture with polyphosphoric acids or their water soluble salts such as the ammonium or potassium salts, thus effecting considerable commercial savings. However, the amount of phosphonic acid present in such mixtures should not be less than 20, preferably not less than 60, molar percent. The extent to which the phosphonic acids are replaced by the polyphosphoric acids is determined by the extent to which the advantages afforded by the use of the phosphonic acids is warranted by their increased cost. Where mixtures of phosphonic and polyphosphoric acids are employed the amount of such mixtures used is that required to achieve the same effects as where the phosphonic acid is used alone. This amount may be readily ascertained for each case by simple trial. Where the proportion of phosphonic acid in the mixture is low, it may be necessary to use an increased total amount of sequestering agent over the minimum amount required to prevent the formation of precipitates, other than sulphides, during reaction of the ammonia and in order to achieve the desired degree of storage-stability in the ammonium phosphate solution products. This excess will depend upon the conditions of storage and the increased amount of sequestering agent needed may readily be determined by simple trial and error. However, the small amount of precipitate which may form when only the above minimum total amount of sequestering agent is employed may be sufficiently small to be tolerated.

As indicated above the storage-stable solutions of the invention find use in the preparation of liquid fertilizers, especially those which also contain potassium. However, in some cases it may be desirable to recover the ammonium phosphates therefrom, for example in order to save on transportation or storage costs. The recovery of the phosphates may conveniently be achieved by considering the solutions as an intermediate in the processes described above for the production of crystalline di-ammonuim phosphates.

EXAMPLE 1

The invention will now be described by way of example with reference to the accompanying drawing which represents a flow diagram of the three processes of the invention for producing crystalline di-ammonium phosphates. In the process using gaseous ammonia the ammonia-containing gas stream (A) obtained from a coke oven is fed into a tar stripper 1 which removes the tars from the gas stream and incidentally also removes about 30% of the ammonia as a very dilute ammoniacal liquor containing about 1½% by weight ammonia. The stripped gas stream is then passed into an absorber 2 into which are fed the appropriate amounts of WPA and phosphonic acid sequestrant to give an N:P ratio in the absorber of about 1.9:1. The water balance in the absorber 2 is adjusted so as to maintain the reaction mixture super saturated with respect to DAP and yet one which is comparatively easy to handle. This may be achieved by varying the concentration of the WPA used or by adding the required amounts of the dilute ammoniacal liquor obtained from the tar stripper 1. The amount of ammoniacal liquor produced in the tar stripper 1 is usually in excess of that required to maintain the water balance in the absorber 2 and the excess is passed to an evaporator 3 where the liquor is distilled in the presence of lime to give ammonia gas which is then fed back into the gas stream entering the absorber 2. The slurry of DAP crystals and liquor issuing from the absorber 2 is fed to a separator 4 where crystals of DAP are separated from the mother liquor which is then recycled to the absorber 2. The recycled mother liquor may be freed from the sulphides formed during the reaction of the WPA and ammonia by passing the liquor through a separator 5, such as a centrifuge, before feeding it back into the absorber 2. The sequestering agent losses during the cycle of the process may be made up by adding the requisite amounts of the sequestrant to either the absorber 2 or, more preferably to the recycling mother liquor.

In the process where the sulphides are separated by filtration from the reaction mixture issuing from the absorber 2 the process is modified to give the following process: The ammonia containing gas stream (B) is passed through a tar stripper 1 and the stripped gas reacted with WPA in an absorber 6 which is now operated at an N:P ratio of about 1.6:1 and under such conditions as will give a reaction product liquor which is not saturated with respect to DAP. This reaction liquor is then filtered free from sulphides in a filter 7 and subsequently evaporated in an evaporator 8, operated at a temperature of from 110 to 120° C., to give a liquor which corresponds to a solution super saturated with respect to DAP at room temperature. This super saturated liquor is then cooled to room temperature in a chiller 9 before the crystals of DAP are recovered in the separator 4. As before the mother liquor may be recycled to the absorber 6 but in this case no separation of sulphides from the mother liquor is required in the separator 5. The dilute ammoniacal liquor obtained incidentally from the tar stripper 1 may be added to the absorber 6 to maintain the desired water balance or distilled in the presence of lime in the evaporator 3 to yield gaseous ammonia which may be fed into the ammonia gas stream entering the absorber 6. The polyphosphate losses are made up as before.

In the process of the invention where ammoniacal liquor is reacted as such, with WPA the ammonia-containing gas stream (C) is passed to a water scrubber 10 which removes about 99% of the ammonia from the gas stream in the form of ammoniacal liquor containing about 1½% by weight ammonia. This liquor is decanted off from the tarry matter. Usually this liquor is too dilute for satisfactory use in the present process and is therefore concentrated in a dephlegmator 11 to give a solution containing at least 10% by weight of ammonia. This concentrated liquor, or, in certain cases where it is concentrated enough, the original liquor, is fed to a reaction vessel 12 where reaction between the WPA and ammonia occurs, sufficient of the sequestrant being added to enable satisfactory crystals of DAP to be obtained later. The reaction vessel is operated at an N:P ratio of about 1.4:1, which may be obtained by controlling the amount of WPA added. Minor adjustments may also be achieved by the use of the ammoniacal liquor from the tar separators 1 used in the gaseous ammonia process described above, after concentration in the dephlegmator 11 if necessary.

The water balance of the reaction vessel is maintained at a level which provides an effluent liquor which is as near super saturation with respect of DAP as is possible. However, since the water content of the ammoniacal liquor is usually of the order of 75% to 90% super saturation is not possible. The reaction product liquor is then passed to an evaporator 13 operated at a temperature of from 110° to 120° C. to provide a liquor which corresponds to a solution super saturated with respect to DAP at room temperature. The sulphides may conveniently be separated from the liquor issuing from the reactor 12 before further treatment occurs by passing the liquor through a separator 14, such as a centrifuge.

The concentrated liquors are then cooled to room temperature in a chiller 15. The N:P ratio of the liquor is adjusted either before cooling or more preferably, after cooling to a value of about 1.9:1. This adjustment may be achieved by the addition of ammoniacal liquor, either concentrated or crude, to the liquor. Although the ammoniacal liquor which is to be added contains a very large proportion of water, it is possible to concentrate the reaction product liquor sufficiently for the adjusted liquor to remain super saturated with respect to DAP. The adjusted liquor is then fed to the separator 4 where the crystalline DAP is recovered. The resulting mother liquor may be recycled to the reaction vessel 12 with removal of sulphides in separator 5 if necessary. The phosphonic acid heel losses may be made up as before.

EXAMPLE 2

1, hydroxyethylidene diphosphonic acid (3 parts) was dissolved with stirring in wet process phosphoric acid (200 parts 31% $P_2O_5$). To this acid was then added aqueous ammonia (85 parts, 24.5% $NH_3$) which had been obtained by the water scrubbing of the gas stream issuing from a coke oven and which had subsequently been concentrated. The tarry matter in the ammonia solution had been largely removed by decantation. The temperature during neutralisation was not controlled. The resultant reaction mixture had an N:P atomic ratio of approximately 1.4:1 and was free from precipitates (other than sulphides). Upon storage at 20° C. for 6 months the reaction mixture remained clear.

The reaction mixture was then evaporated at 110–130° C. at atmospheric pressure to yield a solution which would have been supersaturated with respect to diammonium phosphate at room temperature. Sufficient further aqueous ammonia was added to the resulting solution to raise the N:P ratio to about 1.9:1 and at the same time the solution was cooled to room temperature. The resultant crop of substantially pure diammonium phosphate crystals was recovered by filtration and the mother liquor recycled to form the aqueous reaction medium for further quantities of ammonia and wet process acid.

The crystalline product obtained after several cycles was divided into two portions. One portion was dissolved in water to give a clear solution which remained clear even after standing at 40° C. for 6 months. The other portion (115 parts) was also dissolved in water and potassium chloride (127 parts) and ammonium nitrate (332 parts) added thereto to give a liquid fertilizer of composition 14% $N_2$, 6% $P_2O_5$ and 8% $K_2O$. This composition was clear and remained clear for 6 weeks at 20° C.

By way of comparison the above example was repeated twice. In the first instance no sequestering agent was present in the wet process phosphoric acid. In this case a gelatinous precipitate was thrown down when the ammonia was added and the process could not easily be carried further.

In the second instance the phosphoric acid contained an ammonium polyphosphate heel (30 parts, 11% $N_2$ 33% $P_2O_5$) and reaction with ammonia yielded a clear solution. However, upon standing this solution threw down a progressively increasing precipitate which rendered it unsuitable for use as a liquid fertilizer. If the clear solution was evaporated and further neutralised with ammonia as above, a crop of diammonium phosphate crystals was obtained. The crystals were redissolved in water and the solution divided into two portions. Upon standing at 20° C. one portion became cloudy and a precipitate was progressively formed. To the other portion was added potassium chloride and a precipitate was immediately formed which rendered the solution unsuitable for use as a liquid fertilizer.

EXAMPLE 3

The process of Example 2 was repeated using as sequestrant a mixture of 1, hydroxyethylidene diphosphonic acid (1.5 parts) and an ammonium polyphosphate (18 parts containing 11% $N_2$ and 33% $P_2O_5$). Substantially identical results were noted.

We claim:

1. An improved process for preparing ammonium phosphates by reacting wet process phosphoric acid with ammonia which reaction normally forms an undesirable non-sulphide precipitate, the improvement comprising reacting said ammonia with said phosphoric acid in the presence of an amount of a sequestering agent sufficient to prevent the formation of non-sulphide precipitate, said sequestering agent having the formula

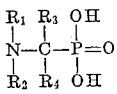

wherein $R_1$, $R_2$, $R_3$ and $R_4$ are each hydrogen or alkyl groups and may be the same or different, or $R_1$ and/or $R_2$ may be

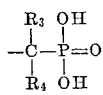

or alkyl ether groups, or a water soluble salt or acid ester thereof, to prevent the formation of non-sulphide precipitates during the reaction.

2. A process according to claim 1 wherein crystals of the diammonium phosphates contained in the ammonium phosphate solution are recovered, the atomic ratio of nitrogen to phosphorus in the liquor from which crystallisation takes place having a value of from 1.5:1 to 2.0:1.

3. A process as claimed in claim 2 wherein the ammonia is that obtained by the destructive distillation of coal.

4. A process according to claim 3 wherein the tarry matter is removed from the ammonia prior to its use.

5. A process according to claim 2 wherein the $R_3$ and $R_4$ groups are

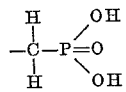

and the $R_1$ and $R_2$ groups are hydrogen.

6. A process according to claim 2 wherein said sequestering agent is admixed with at least one polyphosphate selected from the group consisting of ammonium polyphosphate, potassium polyphosphate, and sodium polphosphate.

7. A process according to claim 6 wherein said sequestering agent is present in at least 20 molar percent of said mixture.

8. A process as claimed in claim 2 wherein said sequestering agent is present in up to 30% by weight, based on the $P_2O_5$ content of the phosphoric acid.

9. A process according to claim 2 wherein the ammonia is used in the form of ammonia-containing gas stream obtained by the destructive distillation of coal.

10. A process according to claim 9 wherein the ammonia is reacted with wet process acid in such amounts that the atomic ratio of nitrogen to phosphorus in the reaction mixture is from 1.7:1 to 1.9:1.

11. A process according to claim 2 wherein the ammonia is employed in the form of the dilute aqueous solution obtained by the water scrubbing of the gases generated by the destructive distillation of coal.

12. A process according to claim 11 wherein the ammonia is reacted with the wet process phosphoric acid at an atomic ratio of nitrogen to phosphorus of from 1.35:1 to 1.45:1, the resulting liquid product is evaporated to a concentration corresponding with a solution supersaturated with respect to diammonium phosphate at room temperature, further ammoniacal liquor is added to increase the atomic ratio of nitrogen to phosphorus to a value between 1.5:1 to 2.0:1 while maintaining super saturation of the solution with respect to diammonium phosphate, and before, during or after such addition the solution is cooled, and the resulting ammonium phosphate crystals recovered from the cooled liquor.

13. A process according to claim 12 wherein the atomic ratio of nitrogen to phosphorus in the evaporated liquor is adjusted to from 1.7:1 to 1.9:1.

14. A process according to claim 9 wherein the ammonia-containing gas stream is reacted with wet process acid at an atomic ratio of nitrogen to phosphorus of from 1.5:1 to 1.6:1, the water content of the reaction mixture being such that the resulting solution to ammonium phosphates is not saturated with respect to diammonium phosphate, this solution is filtered to remove the sulphides formed during the reaction, and than evaporated to give a solution which is super saturated with respect to diammonium phosphate, and the ammonium phosphate crystals are recovered therefrom.

References Cited

UNITED STATES PATENTS

| | | | |
|---|---|---|---|
| 2,928,728 | 3/1960 | Weeks | 71—43 |
| 3,057,711 | 10/1962 | Reusser et al. | 71—43 |
| 3,076,701 | 2/1963 | Bersworth et al. | 71—43 |
| 3,118,730 | 1/1964 | Nickerson | 23—165 |
| 3,259,458 | 7/1966 | Peterson et al. | 23—165 |
| 3,290,140 | 12/1966 | Young | 71—34 |

OSCAR R. VERTIZ, *Primary Examiner.*

LUTHER A. MARSH, *Assistant Examiner.*

U.S. Cl. X.R.

71—43